United States Patent
Ponting et al.

(10) Patent No.: US 11,945,196 B2
(45) Date of Patent: *Apr. 2, 2024

(54) FILMS AND SHEETS HAVING MICROLAYERS AND NANOLAYERS INCLUDING RECYCLED CONTENT

(71) Applicant: Peak Nano Films, LLC, Valley View, OH (US)

(72) Inventors: Michael Ponting, Broadview Heights, OH (US); Wendy Hoenig, Spring, TX (US); Stephen Mark Hoenig, Spring, TX (US)

(73) Assignee: PEAK NANO FILMS, LLC, Valley View, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,318

(22) Filed: Feb. 2, 2022

(65) Prior Publication Data
US 2023/0037896 A1 Feb. 9, 2023

Related U.S. Application Data

(63) Continuation-in-part of application No. 17/552,335, filed on Dec. 15, 2021, now abandoned.
(Continued)

(51) Int. Cl.
*B32B 27/08* (2006.01)
*B29C 48/00* (2019.01)
(Continued)

(52) U.S. Cl.
CPC ............ *B32B 27/08* (2013.01); *B29C 48/022* (2019.02); *B32B 27/32* (2013.01); *B29C 48/08* (2019.02);
(Continued)

(58) Field of Classification Search
CPC ... B32B 27/08; B32B 27/32; B32B 2250/246; B32B 2250/42; B32B 2270/00;
(Continued)

(56) References Cited

U.S. PATENT DOCUMENTS 6,025,079 A * 2/2000 Ciocca .................... B32B 27/32
428/521
9,481,143 B2 11/2016 Dooley et al.
(Continued)

OTHER PUBLICATIONS

Radusin, T. et al., "Use of recycled materials as mid layer in three layered structures—new possibility in design for recycling", Journal of Cleaner Production, 2020, vol. 259, Article No. 120876, pp. 1-11 abstract; pp. 2-3; table 1.

*Primary Examiner* — Ronak C Patel
(74) *Attorney, Agent, or Firm* — NEO IP

(57) ABSTRACT

A polymeric film, sheet, or extrusion coating is formed as a multilayered structure having at least one A layer and at least one B layer. The polymeric film, sheet, or extrusion coating is able to include at least 30% recycled content resin while also exhibiting improved stiffness and strength relative to films with purely virgin polymers. One embodiment of the present invention further presents improved oxygen barrier properties relative to existing films, sheets, or extrusion coatings. Due to the strong structural properties, the polymeric film, sheet, or extrusion coating allows for the inclusion of recycled content into applications where recycled content has previously not been able to be included, such as flexible food, pharmaceutical, or cosmetics packaging.

16 Claims, 9 Drawing Sheets

Related U.S. Application Data

(60) Provisional application No. 63/227,085, filed on Jul. 29, 2021.

(51) Int. Cl.
*B32B 27/32* (2006.01)
*B29C 48/08* (2019.01)
*B29C 48/21* (2019.01)
*B29K 23/00* (2006.01)
*B29K 105/26* (2006.01)
*B29L 31/48* (2006.01)

(52) U.S. Cl.
CPC .......... *B29C 48/21* (2019.02); *B29K 2023/06* (2013.01); *B29K 2023/12* (2013.01); *B29K 2105/26* (2013.01); *B29L 2031/4878* (2013.01); *B32B 2250/246* (2013.01); *B32B 2250/42* (2013.01); *B32B 2270/00* (2013.01); *B32B 2272/00* (2013.01); *B32B 2307/54* (2013.01); *B32B 2307/732* (2013.01); *B32B 2439/70* (2013.01); *B32B 2535/00* (2013.01); *B32B 2555/02* (2013.01); *B32B 2605/00* (2013.01)

(58) Field of Classification Search
CPC ............ B32B 2272/00; B32B 2307/54; B32B 2307/732; B32B 2439/70; B32B 2535/00; B32B 2555/02; B32B 2605/00; B29K 2023/06; B29K 2023/12; B29K 2105/26; B29L 2031/4878; B29C 48/022; B29C 48/08; B29C 48/02

See application file for complete search history.

(56) References Cited

U.S. PATENT DOCUMENTS

| | | | |
|---|---|---|---|
| 10,549,504 | B2 | 2/2020 | Baer et al. |
| 10,549,510 | B2 | 2/2020 | Ettridge et al. |
| 10,583,637 | B2 | 3/2020 | Jenkins et al. |
| 10,759,139 | B2 | 9/2020 | Ponting |
| 2007/0120283 | A1* | 5/2007 | Hostetter ............ B32B 37/153 264/102 |
| 2010/0227136 | A1* | 9/2010 | Ramli ................ B29C 48/3363 264/173.15 |
| 2016/0068288 | A1* | 3/2016 | Palumbo ........... B29C 66/24244 53/511 |
| 2019/0126599 | A1* | 5/2019 | Sargeant ................ B32B 27/08 |
| 2019/0224952 | A1 | 7/2019 | Clare |
| 2020/0061984 | A1 | 2/2020 | Mishra et al. |
| 2020/0238674 | A1 | 7/2020 | Sehanobish et al. |
| 2020/0299043 | A1 | 9/2020 | Drori et al. |
| 2020/0324513 | A1 | 10/2020 | Tian et al. |
| 2022/0371308 | A1* | 11/2022 | Müller ...................... C08J 5/18 |
| 2022/0396689 | A1* | 12/2022 | Breese ................... B32B 27/32 |

\* cited by examiner

FILMS AND SHEETS HAVING MICROLAYERS AND NANOLAYERS INCLUDING RECYCLED CONTENT

CROSS-REFERENCES TO RELATED APPLICATIONS

This application relates to and claims priority from the following U.S. Patent Applications. This application is a continuation-in-part of U.S. patent application Ser. No. 17/552,335, filed Dec. 15, 2021, which claims priority from U.S. Provisional Patent Application No. 63/227,085, filed Jul. 29, 2021, each of which is incorporated herein by reference in its entirety.

BACKGROUND OF THE INVENTION

1. Field of the Invention

The present invention relates to polymeric films, sheets, or extrusion coatings, and more specifically to films, sheets, or extrusion coatings having microlayers and/or nanolayers for use in packaging.

2. Description of the Prior Art

It is generally known in the prior art to provide films as bags for food, pharmaceutical, and specialty packaging or as liners for other forms of packaging. The films used in this capacity in the prior art typically include aluminum foil or a metal oxide layer as a backing to the film.

Prior art patent documents include the following:

U.S. Pat. No. 10,759,139 for Multicomponent layered dielectric film and uses thereof by inventor Ponting, filed Dec. 4, 2015 and issued Sep. 1, 2020, discloses a multicomponent dielectric film including discrete overlapping dielectric layers of at least a first polymer material, a second polymer material, and a third polymer material. Adjoining dielectric layers define a generally planar interface therebetween which lies generally in an x-y plane of an x-y-z coordinate system. The interfaces between the layers delocalizing the charge build up in the layers. At least one dielectric layer including a stack of discrete polymer layers with polymer layer interfaces extending transverse to the x-y plane and optionally at least one filler having a higher dielectric constant than the first polymer material, the second polymer material, and/or the third polymer material.

U.S. Pat. No. 10,583,637 for Coextruded multilayer film with propylene-based polymer barrier layer by inventors Jenkins et al., filed Jun. 25, 2014 and issued Mar. 10, 2020, discloses a coextruded multi layer film. The coextruded multilayer film includes a core component having from 15 to 1000 alternating layers of layer A and layer B. Layer A has a thickness from 30 nm to 1000 nm and includes a propylene-based polymer having a crystallization temperature (T1c). Layer B includes a second polymer having a glass transition temperature (T2g), wherein T1c<T2g. Layer A has an effective moisture permeability less than 0.40 g-mil/100 in$^2$/day.

U.S. Pat. No. 9,481,143 for Multilayer structures having annular profiles by inventors Dooley et al., filed Oct. 18, 2013 and issued Nov. 1, 2016, discloses film structures having annular profiles, and methods and apparatus of making the structures. The annular multilayer articles have a uniform thickness, at least four layers and comprise overlapped and non-overlapped circumferential areas; wherein the layer structure of the non-overlapped area is doubled in the overlapped layer. A method of making the structure includes providing a multilayer flow stream with at least four layers of thermoplastic resinous materials; feeding the multilayer flow stream to a distribution manifold of an annular die to form an annular multilayer flow stream; and removing the annular multilayer flow stream from the annular die to form the annular multilayer structure. Also disclosed is an apparatus, comprising: a feedblock, with optional layer multiplier, that provides a multilayer flow stream of at least four layers to the manifold of an annular die; and an annular die having at least one distribution manifold that extrudes a multilayer flow stream.

US Patent Publication No. 2020/0238674 for All-polyethylene laminate film structures having barrier adhesive layer by inventors Sehanobish et al., filed May 9, 2018 and published Jul. 30, 2020, discloses recyclable, all-polyethylene laminate film structures suitable for use in a flexible packaging. The structures comprise a film layer consisting essentially of an ethylene-based polymer and a barrier adhesive layer disposed on a surface of the film layer, wherein the structure has an oxygen transmission rate not greater than 100 $O_2/m^2$/day, measured according to ASTM Method D3985. Recyclable, all-polyethylene laminate film structures suitable for use in a flexible packaging are disclosed comprising (A) a sealant film layer consisting essentially of an ethylene-based polymer, (B) an intermediate film layer consisting essentially of an ethylene-based polymer, (C) a structural film layer consisting essentially of an ethylene-based polymer, and (D) a barrier adhesive layer, wherein the recyclable, all-polyethylene laminate film structure has an oxygen transmission rate not greater than 100 $O_2/m^2$/day, measured according to ASTM Method D3985. Articles comprising the laminate film structures, such as flexible packaging and stand-up pouches, are also disclosed.

US Patent Publication No. 2020/0061984 for Polyethylene laminates for use in flexible packaging materials by inventors Mishra et al., filed Apr. 4, 2018 and published Feb. 27, 2020, discloses embodiments of a laminate structure for use in flexible packaging comprising a sealant film comprising ethylene-based polymer, and a multilayer polyethylene print film laminated to the sealant film. The print film comprises at least 3 layers and has an overall thickness from 15 to 30 μm. The print film comprises a middle layer, an inner layer disposed between sealant film and the middle layer, and an outer layer, wherein the middle layer comprises at least 90% by weight high density polyethylene (HDPE) polymer having a density from 0.950 to 0.965 g/cc. The inner layer and the outer layer comprise linear low density polyethylene (LLDPE) having a density from 0.925 to 0.965 g/cc. The laminate structure yields desired optical and mechanical properties coupled with recyclability and improved printing efficiency, while maintaining these low thicknesses for the print film.

US Patent Publication No. 2020/0299043 for Fully recyclable polyethylene packaging by inventors Drori et al., filed Jun. 12, 2019 and published Sep. 24, 2020, discloses a multilayer polymer film for use in packaging, particularly food packaging, and packaging made from the multilayer film, along with methods of manufacture of the multilayer film and the packaging. In preferred embodiments, the polymer film comprises an outer layer comprising machine direction oriented high-density polyethylene, an intermediate layer comprising adhesive and optionally ink, and an inner layer comprising high-density polyethylene, metallocene linear low-density polyethylene, and a plastomer. The inner or outer layer can be coated to lower the water vapor and oxygen transmission rates. In preferred embodiments, the layers are laminated to form the multilayer film. The multilayer film can be used to produce food packaging such as heat-sealable bags or pouches. Packaging made from the film is suitable for hot filling, and in contrast to packaging materials known in the art for hot filling, is fully recyclable.

US Patent Publication No. 2020/0324513 for Recyclable films for product packaging by inventors Tian et al., filed Dec. 29, 2017 and published Oct. 15, 2020, discloses recyclable films for packaging a product having a composition comprising a polyethylene, and the film is oriented and irradiatively cross-linked. The recyclable films have excellent heat resistant properties, Multilayer films for packaging a product comprise an outer film comprising any recyclable film of the disclosure and a sealant layer or film. Onset of sticking by an outer surface of the recyclable film upon exposure to heat sealing conditions is at least 5 to 15° C. higher than a comparative outer surface of a comparative outer film comprising the polyethylene that is not oriented and irradiatively cross-linked.

U.S. Pat. No. 10,549,510 for Flexible multilayer packaging film with ultra-high barrier properties by inventors Ettridge et al., filed Jun. 30, 2016 and issued Feb. 4, 2020, discloses a flexible multilayer packaging film with high gas barrier properties comprising one or more support layer(s), one or more barrier layer(s), each of the one or more barrier layer(s) comprising an organic layer and an inorganic layer, wherein said multilayer film has an oxygen transmission rate of less than 0.1 cm3/m2/24 h/atm, preferably less than 0.05 cm3/m2/24 h/atm, most preferably less than 0.03 cm3/m2/24 h/atm measured at 23° C. and 50% relative humidity.

US Patent Publication No. 2019/0224952 for Recyclable package made from co-extruded film structure by inventor Clare, filed Aug. 24, 2017 and published Jul. 25, 2019, discloses a recyclable package such as a Stand Up Pouch (SUP) prepared using a coextruded polyethylene structure having a first surface layer, a first intermediate layer, a second intermediate layer, and a second surface layer which is a sealable layer. The coextruded structure contains two layers of High Density Polyethylene (HDPE) to provide stiffness. The structure also contains a layer of lower density polyethylene. The structure is optionally surface printed. This structure is suitable for preparing packages for a wide variety of flowable foods (including liquids and solids).

U.S. Pat. No. 10,549,504 for Confined crystallization multilayer films by inventors Baer et al., filed Dec. 7, 2009 and issued Feb. 4, 2020, discloses a multilayer film including an extruded first polymer layer confined between extruded second polymer layers. The first polymer layer includes a high aspect ratio crystalline lamellae. The multilayer film is substantially impermeable to gas diffusion.

SUMMARY OF THE INVENTION

The present invention relates to polymeric films, sheets, or extrusion coatings, and more specifically to polymeric films, sheets, or extrusion coatings comprising a multitude of layers for use in packaging.

It is an object of this invention to provide a film, sheet, or extrusion coating capable of being used for packaging, especially food packaging, wherein the film, sheet, or extrusion coating includes a number of layers, including at least one layer comprising post-consumer recycled content and/or post-industrial recycled content while maintaining or improving physical properties. It is also an object of this invention to provide a film, sheet, or extrusion coating that is partially or fully recyclable.

In one embodiment, the present invention is directed to a film, including a plurality of layers, including at least one A layer and at least one B layer, wherein the at least one A layer comprises at least one virgin polymer, wherein the at least one B layer comprises at least one recycled polymer, wherein the plurality of layers includes at least 32 layers, wherein each of the plurality of layers has a thickness between about 100 nm and about 3 microns, and wherein the film includes at least 10% recycled polymer resin.

In another embodiment, the present invention is directed to a method of producing a multilayer film, including providing a plurality of extruders connected to multilayered coextrusion tooling, extruding a plurality of polymers from the plurality of extruders to the multilayered coextrusion tooling to form a layered structure, extruding at least one skin layer onto the layered structure, wherein the at least one skin layer affixes to a top surface and/or a bottom surface of the layered structure, thereby forming the multilayer film, wherein the multilayer film includes at least 10% recycled content resin.

In yet another embodiment, the present invention is directed to a sheet, including a plurality of layers, including at least one A layer and at least one B layer, wherein the at least one A layer comprises at least one virgin polymer, wherein the at least one B layer comprises at least one recycled polymer, and wherein each of the plurality of layers has a thickness between about 100 nm and about 3 microns.

In still another embodiment, the present invention is directed to a polymer extrusion coating, including a plurality of layers, including at least one A layer and at least one B layer, wherein the at least one A layer comprises at least one virgin polymer, wherein the at least one B layer comprises at least one recycled polymer, and wherein each of the plurality of layers has a thickness between about 100 nm and about 3 microns.

These and other aspects of the present invention will become apparent to those skilled in the art after a reading of the following description of the preferred embodiment when considered with the drawings, as they support the claimed invention.

DETAILED DESCRIPTION

Figure 1:
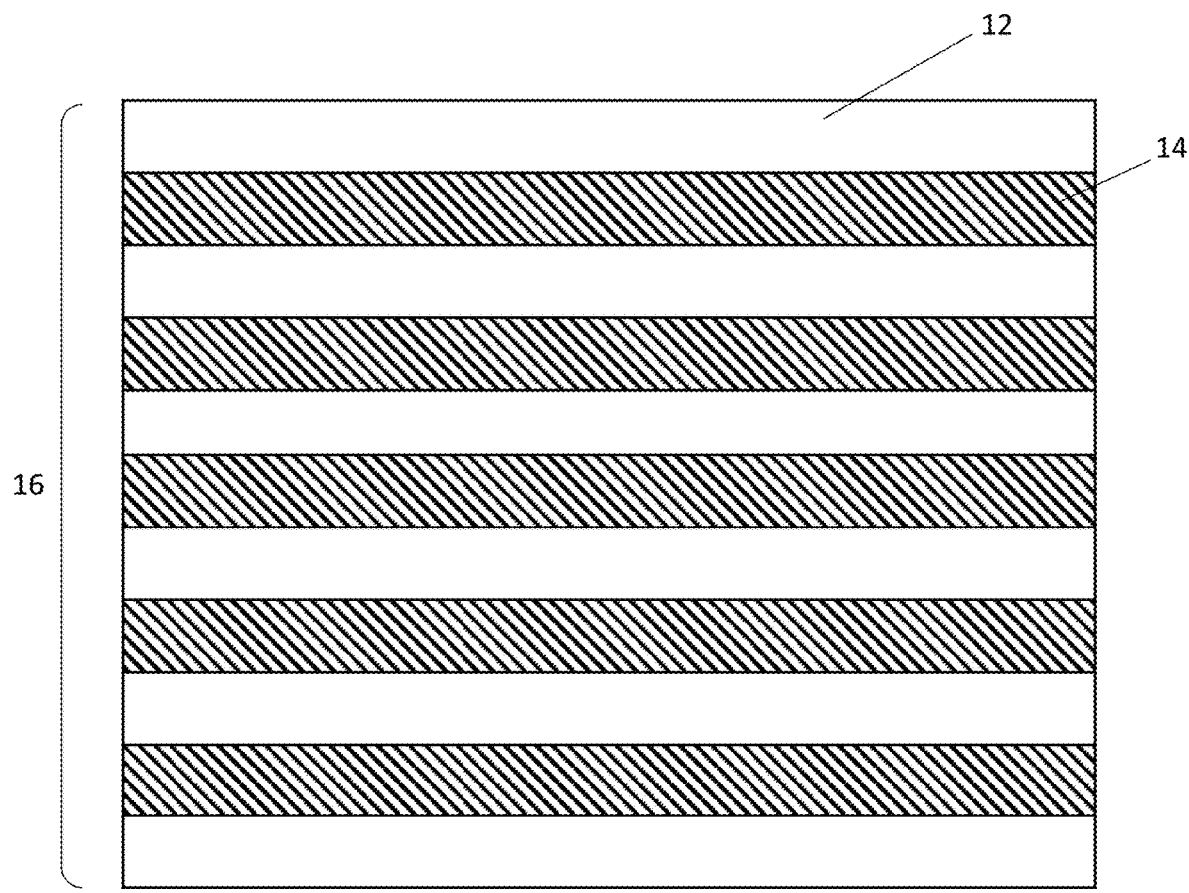
FIG. 1 illustrates a layered film structure having an alternating pattern of layers according to one embodiment of the present invention.

The present invention is generally directed to polymeric films, sheets, or extrusion coatings and more specifically to polymeric films, sheets, or extrusion coatings comprising a multitude of layers for use in packaging. More particularly, the present invention includes polymeric films, sheets, or extrusion coatings having a multitude of microlayers and/or nanolayers, wherein the film, sheet, or extrusion coating is suitable for packaging, including food, pharmaceutical, and cosmetics packaging for providing moisture and oxygen barriers and protection or sealing from exterior contamination and/or degradation. Furthermore, the present invention includes polymeric films, sheets, or extrusion coatings having substantial quantities of recycled content and improved mechanical properties relative to films in the prior art. However, the present invention is not limited to food packaging applications. One of ordinary skill in the art will also understand that the present invention is also able to be used for packaging electronics, pharmaceuticals, cosmetics, consumer goods, medical products, medical tools, and other products. Thicker sheet versions of the present invention are able to be used for durable applications in markets including, but not limited to, construction and farm equipment housings, automotive exterior and interior parts, small appliances, wallboard and patio furnishings, and other products.

In one embodiment, the present invention is directed to a film, including a plurality of layers, including at least one A layer and at least one B layer, wherein the at least one A layer comprises at least one virgin polymer, wherein the at least one B layer comprises at least one recycled polymer, wherein the plurality of layers includes at least 32 layers, wherein each of the plurality of layers has a thickness between about 100 nm and about 3 microns, and wherein the film includes at least 10% recycled polymer resin.

In another embodiment, the present invention is directed to a method of producing a multilayer film, including providing a plurality of extruders connected to multilayered coextrusion tooling, extruding a plurality of polymers from the plurality of extruders to the multilayered coextrusion tooling to form a layered structure, extruding at least one skin layer onto the layered structure, wherein the at least one skin layer affixes to a top surface and/or a bottom surface of the layered structure, thereby forming the multilayer film, wherein the multilayer film includes at least 10% recycled content resin.

In yet another embodiment, the present invention is directed to a sheet, including a plurality of layers, including at least one A layer and at least one B layer, wherein the at least one A layer comprises at least one virgin polymer, wherein the at least one B layer comprises at least one recycled polymer, and wherein each of the plurality of layers has a thickness between about 100 nm and about 3 microns.

In still another embodiment, the present invention is directed to a polymer extrusion coating, including a plurality of layers, including at least one A layer and at least one B layer, wherein the at least one A layer comprises at least one virgin polymer, wherein the at least one B layer comprises at least one recycled polymer, and wherein each of the plurality of layers has a thickness between about 100 nm and about 3 microns.

None of the prior art discloses using a microlayering or nanolayering process to incorporate recycled content into packaging film, sheet, or extrusion coating. In recent years, there has been growing emphasis on utilizing recycled material, including both post-consumer recycled material and post-industrial recycled material, in plastics in order to increase the sustainability of producing and using the plastics. For example, in September 2020, California passed Assembly Bill 793, which is incorporated herein by reference in its entirety, requiring the use of at least 15% post-consumer recycled resin in plastic bottles by 2022, 25% by 2025, and 50% by 2030. At a national level in the United States, Senate Bill 984, or the Break Free From Plastic Pollution Act of 2021, which is incorporated herein by reference in its entirety, proposes that plastic beverage containers be made from at least 50% post-consumer recycled content. Additionally, Directive 2019/904 of the European Union, which is incorporated herein by reference in its entirety, passed in 2019 and requires that plastic beverage bottles utilize at least 25% recycled plastic by 2025 and 30% recycled plastic by 2030. These laws present a challenge for food packaging manufacturers, as companies are required to include structurally weaker and potentially contaminating substances in their packaging or risk significant fines.

While the aforementioned regulations are directed primarily to plastic bottles, there is a need to prepare for the possibility that such regulations could be extended to other forms of plastic packaging as well. For example, Assembly Bill 478 in California, which was first introduced in February 2021, would require thermoform plastic containers (including those used for food, such as egg cartons) to be made from at least 30% post-consumer recycled content by 2030. Assembly Bill 478 is incorporated herein by reference in its entirety. Other states, such as Washington, have already passed more broadly sweeping single use plastic recycled content restrictions, such as Senate Bill 5022, which is incorporated herein by reference in its entirety. Senate Bill 5022 requires that certain forms of packaging, including milk containers and certain household personal care products be made from at least 50% post-consumer recycled content by 2036. Additionally, Connecticut Senate Bill 928, Maine's LD1541, and Maryland Senate Bill 116, each of which is incorporated herein by reference in its entirety, each contemplate increased recycled content standards, indicating a strong trend in the regulatory environment.

Currently, not only do food packaging films not commonly include recycled material, but they also frequently use materials that decrease or eliminate the recyclability of the film as a whole. For example, potato chip bags, popcorn bags, candy wrappers, and other types of food packaging films commonly use metallized films (e.g., polypropylene with an aluminum backing), which are not recyclable in most areas because the materials are mixed. Some films include mixtures of different materials, such as both PET and polyethylene, which also decreases the recyclability of the materials. Metallization and the inclusion of non-recyclable polymers are done for a variety of reasons, including improved moisture and oxygen barrier properties relative to a pure polymer film. Additionally, manufacturers often metallize film to reduce light exposure to the contents within and to increase the barrier to oxygen. Without the metallization or some other method of decreasing light exposure, the light causes contents to degrade more quickly in some situations. Currently, metallization is able to increase the shelf-life of food products by orders of magnitude higher than currently offered films that only include polyolefins. Absent a polyolefin product with greatly improved moisture barrier and/or oxygen barrier properties, there is high incentive for the food packaging industry to continue metallizing films.

The inclusion of other barrier polymers, such as ethylene vinyl alcohol (EVOH), creates further issues for recycled materials. EVOH is commonly included in films and other polymer articles (e.g., plastic bottles) in order to mitigate the issue of gases migrating through the plastic. However, when plastic containing EVOH is recycled, the EVOH is no longer a single continuous barrier within the recycled material, but rather discontinuously dispersed throughout the recycled material. Therefore, when the recycled material is repurposed, the EVOH impurities in the plastic both damage the overall material properties of the polymer and fail to function as an effective barrier. In order to have an effective gas barrier for packaging when using the recycled polymer, additional barrier layers must again be added, either weakening the structure or causing the packaging to be made thicker.

For the present invention, the inclusion of microlayers was found to provide particular benefits for both the structural integrity of the film and the barrier properties of the film relative to a simple blended mixture of recycled polymer with virgin polymer. Furthermore, these benefits were found to be more pronounced for layers having a thickness of approximately 100 nanometers to 3 microns compared to layers having a thickness on the order of 15-20 microns or greater, which is common in the industry today. One rationale for the improved properties of lower thickness layers is provided in the article "Forced Assembly of Polymer Nanolayers Thinner Than the Interphase" by Liu et al., Macromolecules 28 (November 2005), which is hereby incorporated by reference in its entirety. Liu et al. demonstrates that polymer layers brought into intimate contact at nanoscale lengths exhibit interdiffusion of polymers from one layer into an adjacent layer, thereby increasing the adhesion strength between the layers. For layer interfaces that are not perfectly straight, interdiffusion assists in providing additional stability to the structure and is capable of decreasing the oxygen permeability of the structure.

However, while Liu describes interdiffusion effects as dominating in layers on the order of 100 nm in thickness or thinner, for films with layers of a thickness of about 1 micron, other effects also significantly contribute to improved mechanical properties. For example, for some polymers, as layers become thinner, the morphology of the layers change from being spherulitic, wherein many of the lamellae within the material are randomly oriented, to being more aligned, thereby improving the mechanical properties. However, for other polymers, the lamellae don't align and instead the crystallinity of the polymers drops, actually reducing the barrier properties of the polymer. The benefits of reducing layer size in creating truncated spherulites and thereby increasing barrier capabilities is further described in U.S. Pat. No. 10,583,637, which is incorporated herein by reference in its entirety.

Additionally, the article "Deformation behavior of coextruded multilayer composites with polycarbonate and poly (styrene-acrylonitrile)" by Gregory et al., Journal of Materials Science 22 (1987), which is incorporated herein by reference in its entirety, explains that the inclusion of multiple polymer layers within a material creates an expanded damage zone, which delocalizes stress within the material and delays fracture of the material, thereby improving material properties. Additionally, as explained in "Deformation of Confined Poly(ethylene oxide) in Multilayer Films" by Lai et al., ACS Applied Materials & Interfaces 2012, which is incorporated herein by reference in its entirety, as layer thickness decreases, the deformation mechanism for the structure changes from that of crystalline alignment to nonuniform micronecking, which causes the performance of microlayered and nanolayered material to improve.

Dispersing recycled material over a larger number of layers provides a distinct advantage over the prior art, which typically uses between only 3 to 9 layers in each film, with those layers typically being thicker than about 10 microns. By dispersing the polymer material throughout the film, both the mechanical properties and the optical properties of the film are better able to be fine-tuned and the interdiffusion benefits described in Liu et al. are better able to be achieved. Compared to existing methods of burying the recycled polymer in a center layer of the material and thereby creating a film with poorer mechanical properties, the present invention has demonstrated improved mechanical properties relative to a virgin polymer film.

Presently, producers avoid the inclusion of any amount of recycled content in films, and especially high amounts (e.g., greater than 10%) of recycled content in films, in part because of the loss of mechanical properties, poor moisture and/or oxygen barrier abilities, and poor optical properties of films with recycled content. Furthermore, manufacturers avoid recycled content for food packaging specifically due to fears that it will contaminate food. However, producers included microlayers and/or nanolayers into film avoid including recycled content for additional reasons, including unique rheological properties and material variability inherent in recycled material, which makes incorporating smooth films with layers with easily controllable content more difficult, especially for layers with 100% recycled content resin. Therefore, given the anticipated problematic characteristics of recycled content and the particular difficulties of incorporating recycled content into microlayers and/or nanolayers, the prior art teaches away from the present invention.

Referring now to the drawings in general, the illustrations are for the purpose of describing one or more preferred embodiments of the invention and are not intended to limit the invention thereto.

As shown in FIG. 1, the multilayer structure of the present invention includes a plurality of layers. In one embodiment, the plurality of layers includes at least one A layer 12 and at least one B layer 14. In one embodiment, the at least one A layer 12 and the at least one B layer 14 include different polymers and/or include polymers with different properties. For example, in one embodiment, the at least one A layer 12 includes virgin polypropylene material, and the at least one B layer 14 comprises a percentage of recycled polypropylene higher than that in the at least one A layer 12. By way of example, and not of limitation, in one embodiment, the percentage of recycled polypropylene in the at least one B layer 14 is between about 1% and about 100% higher than the percentage of recycled polypropylene in the at least one A layer 12. In another embodiment, the percentage of recycled polypropylene in the at least one B layer 14 is between about 10% and about 50% higher than the percentage of recycled polypropylene in the at least one A layer 12. In yet another embodiment, the percentage of recycled polypropylene in the at least one B layer 14 is between about 20% and about 30% higher than the percentage of recycled polypropylene in the at least one A layer 12. In another embodiment, the at least one A layer 12 includes a first polymer (e.g., polypropylene), and the at least one B layer 14 includes a second polymer (e.g., polyethylene).

In one embodiment, the plurality of layers includes between about 2 total layers to about 10,000,000 total layers. In another embodiment, the plurality of layers includes between about 3 total layers and about 500 total layers. In another embodiment, the plurality of layers includes between about 2 and about 500 total layers. In a preferred embodiment, the plurality of layers includes between about 10 total layers and about 50 total layers. In a more preferred embodiment, the plurality of layers includes between about 30 total layers and about 40 total layers. In one embodiment, none of the layers include aluminum foil, any metallized backing, nor any metal layers. In one embodiment, barrier polymers, such as polyvinylidene chloride (PVDC), ethylene vinyl alcohol (EVOH), or polyethylene naphtalate (PEN), are not included in the film, as the confined crystallinity of the microlayers and/or nanolayers provides for increased barrier capabilities even in the absence of barrier polymers. In another embodiment, barrier polymers comprise less than 5% of the film. In yet another embodiment, barrier polymers are only included in the film insofar as they are blended into the resin of recycled material, with no distinct barrier layers being extruded in the film.

In one embodiment, each of the plurality of layers has a thickness between about 10 nm and about 15 microns. In another embodiment, each of the plurality of layers has a thickness between about 25 nm and about 5 microns. In yet another embodiment, each of the plurality of layers has a thickness between about 100 nm and about 3 microns. In still another embodiment, each of the plurality of layers has a thickness between about 1 micron and about 2 microns. In one embodiment, each of the plurality of layers has a thickness between about 0.5 microns and about 2 microns.

In one embodiment, the overall thickness of the film formed by the plurality of layers is between about 1 micron and about 5 mm. In another embodiment, the overall thickness of the film formed by the plurality of layers is between about 12 microns and about 1 mm. In yet another embodiment, the overall thickness of the film formed by the plurality of layers is between about 25 microns and about 100 microns. In still another embodiment, the overall thickness of the film formed by the plurality of layers is about 50 microns.

In one embodiment, the sheet of the present invention has an overall thickness between about 100 microns and about 12.5 mm. In another embodiment, the sheet of the present invention has an overall thickness of between about 300 microns and about 3 mm. In yet another embodiment, the sheet of the present invention has an overall thickness between about 500 microns and about 2 mm.

In one embodiment, the present invention is an extrusion coating, wherein the coating covers polypropylene, polyethylene, paper, paperboard, corrugated fiberboard, aluminum foil, or other products. The present invention should not be understood to be limiting regarding the types of material able to be covered with the extrusion coating. In one embodiment, the extrusion coating has a total thickness between about 10 microns and about 100 microns. In another embodiment, the extrusion coating has a total thickness between about 20 microns and about 70 microns.

Figure 2:
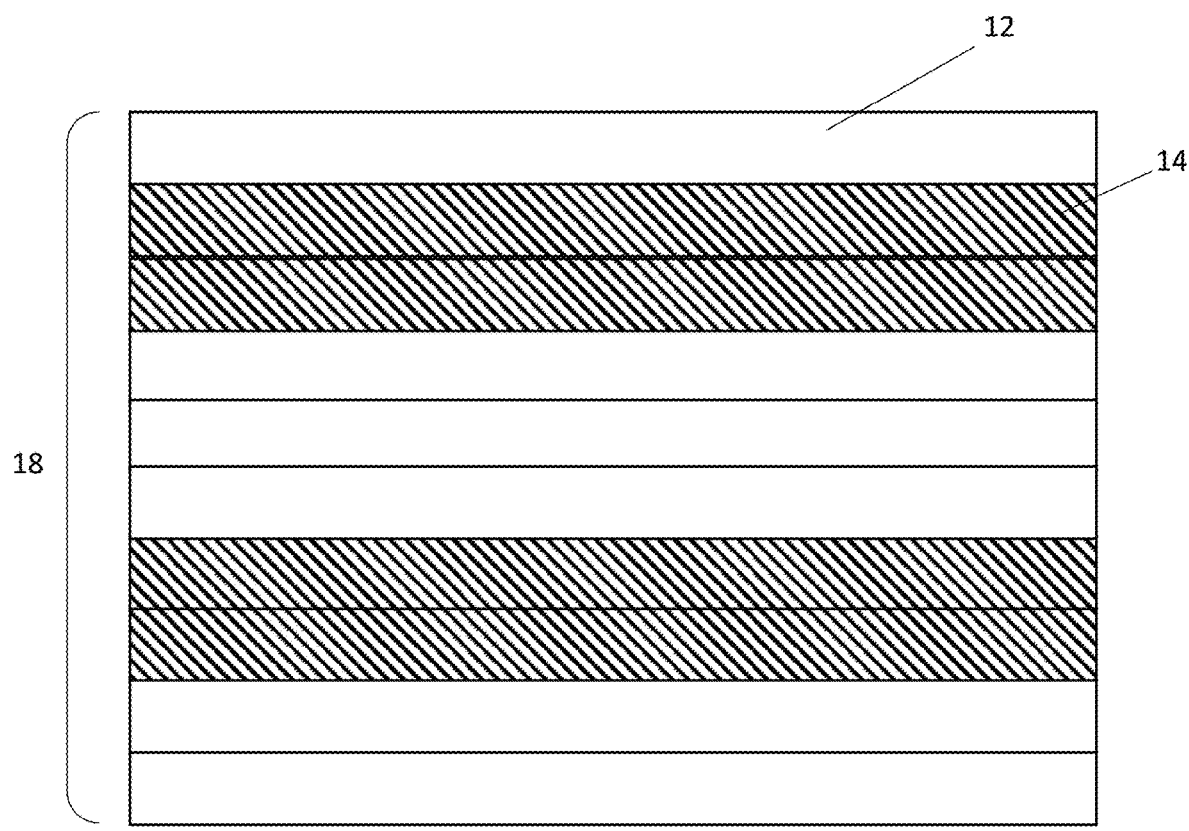
FIG. 2 illustrates a layered film structure having an alternating pattern of layers according to another embodiment of the present invention.
Figure 3:
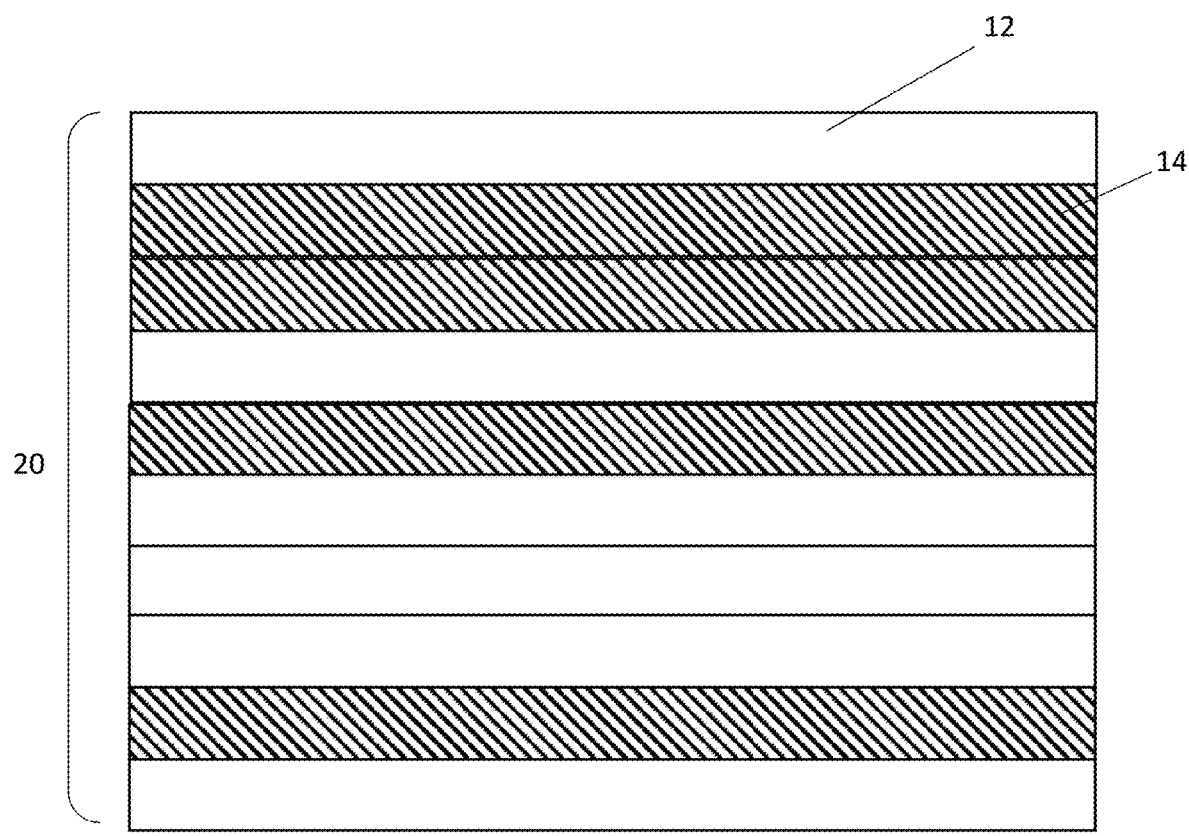
FIG. 3 illustrates a layered film structure according to yet another embodiment of the present invention.

In one embodiment, as shown in FIG. 1, the at least one A layer and at least one B layer are arranged in a simple alternating pattern 16 (ABABABA). In another embodiment, as shown in FIG. 2, the at least one A layer 12 and the at least one B layer 14 are stacked in an alternating pattern other than a simple alternating pattern, such as a double alternating pattern 18 (AABBAA) or another alternating pattern (e.g., ABBABBA, ABBAABABBAA, etc.). In yet another embodiment, as shown in FIG. 3, the at least one A layer 12 and the at least one B layer 14 are arranged in a non-alternating pattern 20. Arranging the layers in varying patterns allows the relative percentage of polymers included in each type of layer to be varied more precisely. By way of example, and not of limitation, if the at least one B layer includes more recycled polymer content than the at least one A layer, and a higher concentration of recycled content is required, then a ABBBABBBA pattern is able to be used rather than, for example, an ABABABA pattern. Furthermore, control of the location of specific layers allows for greater control over the positioning of the location of recycled content relative to an exterior surface (or, more specifically, a food contact surface) of the plurality of layers. By way of example, and not of limitation, in one embodiment, layers containing recycled content are positioned at least three layers away from an exterior surface of the plurality layers, such that contaminants in the recycled content do not diffuse into food items contacting the plurality of layers. The term "exterior surface" as it is used herein refers to any outside surface of the plurality of layers and is not intended to suggest that the exterior surface does not contact packaged items.

Figure 4:
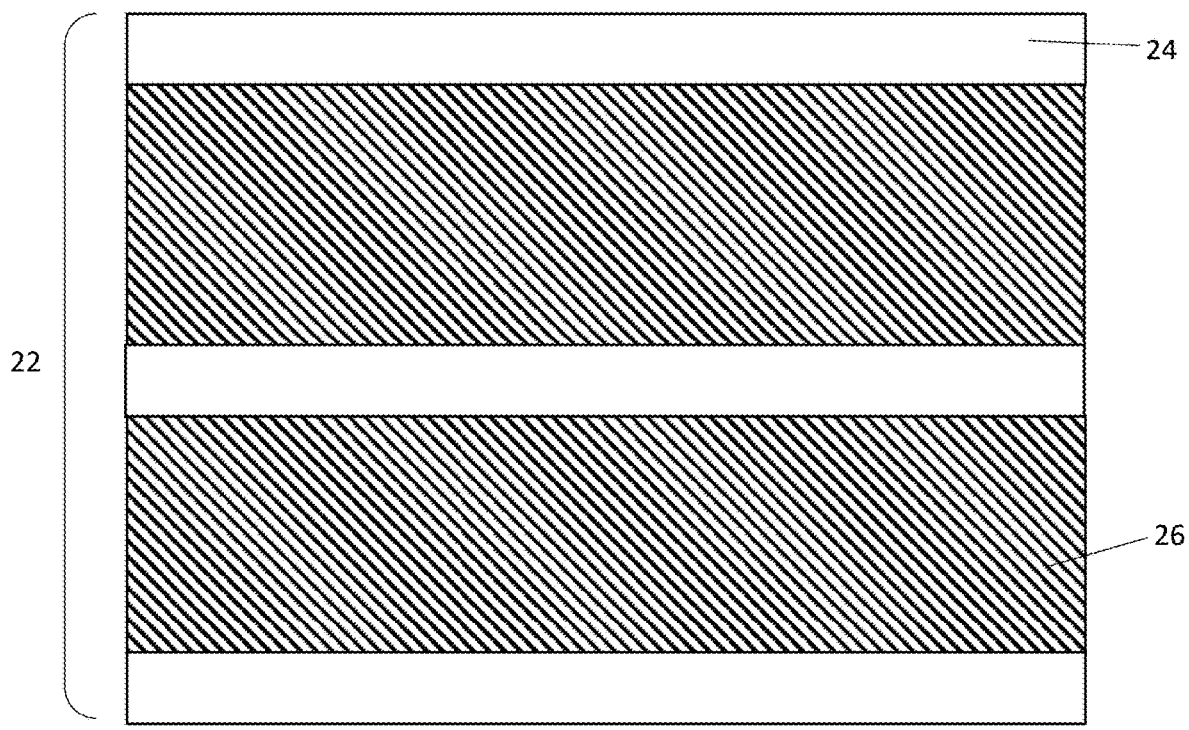
FIG. 4 illustrates a layered film structure having layers of variable sizes according to one embodiment of the present invention.

In one embodiment, as shown in FIGS. 1-3, each of the plurality of layers is approximately the same thickness. In another embodiment, as shown in FIG. 4, the plurality of layers includes layers of varying thickness. For example, in one embodiment, at least one A layer 24 is thinner than at least one B layer 26. In one embodiment, the at least one A layer 24 and the at least one B layer 26 are arranged in a simple alternating pattern 22, a non-simple alternating pattern (e.g., a double alternating pattern), or a non-alternating pattern. In one embodiment, each type of layer is approximately the same thickness. By way of example, and not of limitation, in one embodiment, each of the at least one A layer 24 is about 1 micron in thickness and each of the at least one B layer 26 is about 3 microns in thickness. In another example, each of the at least one A layer 24 is about 1 micron in thickness and each of the at least one B layer 26 is about 350 nm in thickness. In another embodiment, individual layers of each type are not approximately the same thickness. By way of example, and not of limitation, in one embodiment, the plurality of layers includes simple alternating A and B layers, with layers closer to the exterior of the plurality of layers being thicker (e.g., about 3 microns), and layers closer to the interior of the plurality of layers being thinner (e.g., about 1 micron), regardless of the type of layer. In another embodiment, layers closer to one end of the plurality of layers are thicker than layers closer to an opposite end of the plurality of layers. Varying the thickness of each layer provides an alternative to varying the pattern of types of layers, while still providing for the ability to, for example, alter the total amount of recycled content in the plurality of layers.

In one embodiment, the plurality of layers has layer interfaces substantially parallel to the top and bottom surfaces of the plurality of layers. In another embodiment, the plurality of layers has layer interfaces substantially orthogonal to the top and bottom surfaces of the plurality of layers. The orientation of the layer interfaces of the plurality of layers depends chiefly on the shape and structure of the multiplier die used to form the plurality of layers.

In another embodiment, the plurality of layers includes a 2D layered structure. For example, as disclosed in U.S. patent application Ser. No. 17/174,034, which is incorporated herein by reference in its entirety, in one embodiment, the plurality of layers includes a first type of layer including a first material, and a second type of layer including a horizontal stack of discrete layers with layer interfaces orthogonal to the layer interfaces between the first type of layer and the second type of layer. Including a two-dimensional layer structure assists in further confining the size of polymer domains, thereby increasing the effects of interdiffusion, confined crystallinity, and the like. For example, in one embodiment, the first type of layer includes a first virgin polymer material (e.g., virgin polypropylene), and the second type of layer includes alternating layers of a virgin polymer material and a recycled polymer material (e.g., 30% recycled resin polypropylene).

Figure 5:
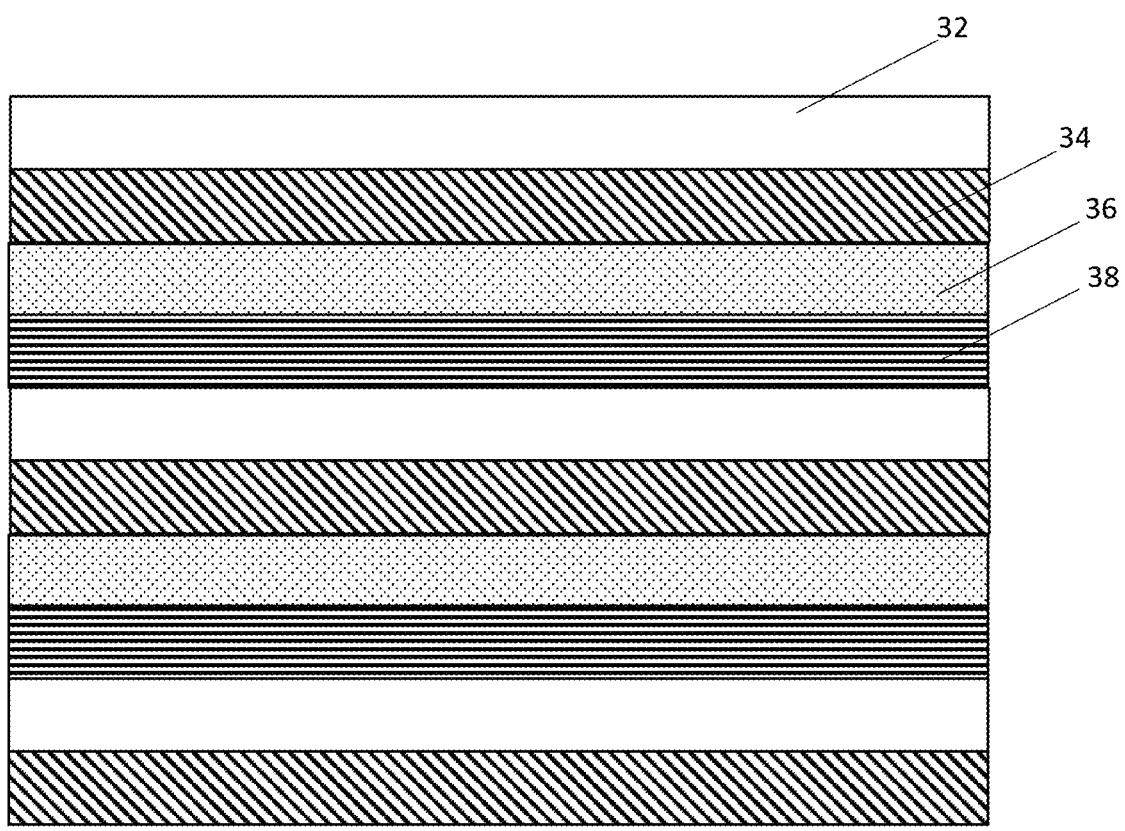
FIG. 5 illustrates a layered film structure having more than two types of layers according to one embodiment of the present invention.

In another embodiment, as shown in FIG. 5, the plurality of layers includes more than two types of layers. For example, in one embodiment, the plurality of layers includes at least one A layer 32, at least one B layer 34, at least one C layer 36, and at least one D layer 38. One of ordinary skill in the art will appreciate that different types of layers are able to represent entirely different polymers, one or more of the same polymers with different properties, and/or differential percentages of recycled content of the same type of polymer. By way of example, and not of limitation, in one embodiment, the at least one A layer 32 consists of virgin polymer material, the at least one B layer 34 includes 15% recycled content, the at least one C layer 36 includes 30% recycled content, and the at least one D layer includes 50% recycled content. As described above, the thickness of each layer is able to be varied, as is the pattern of the types of layers. One of ordinary skill in the art will understand that embodiments of the present invention are not intended to be limited to four types of layers, but any number of types of layers. For example, in one embodiment, the plurality of layers includes between about 2 and about 100 different types of layers. In another embodiment, the plurality of layers includes between about 2 and about 50 different types of layers. In yet another embodiment, the plurality of layers includes between about 2 and about 10 different types of layers.

In one embodiment, any single type of layer (e.g., A layer, B layer, C layer, etc.) comprises between about 1% and about 99% of the total multilayer structure by weight. In another embodiment, the percent weight of each type of layer within the multilayer structure is approximately equal.

In one embodiment, the multilayer structure includes between about 1% and about 99% recycled content resin. In another embodiment, the multilayer structure includes between about 10% and about 80% recycled content resin. In yet another embodiment, the multilayer structure includes between about 25% and about 50% recycled content resin. In still another embodiment, the multilayer structure includes about 10% recycled content resin. In still yet another embodiment, the multilayer structure includes about 25% recycled content resin. In still yet another embodiment, the multilayer structure includes about 30% recycled content resin. In still yet another embodiment, the multilayer structure includes about 50% recycled content resin.

Figure 6:
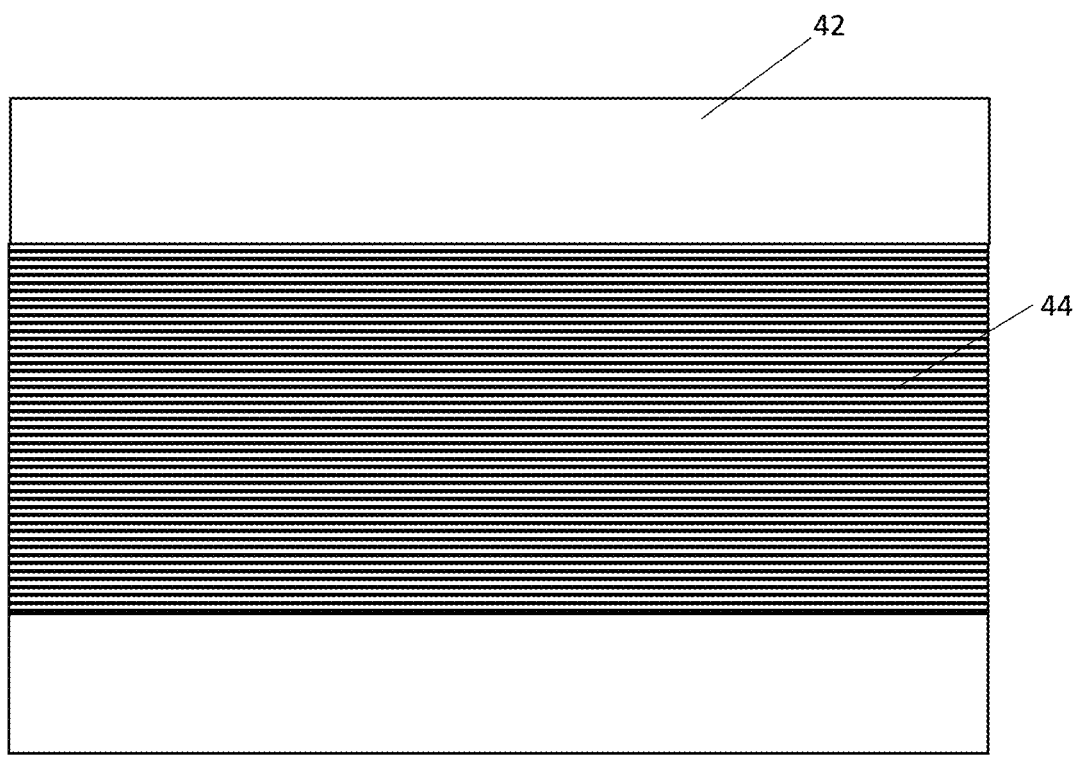
FIG. 6 illustrates a layered film structure disposed between two skin layers according to one embodiment of the present invention.

FIG. 6 illustrates a layered film structure disposed between two skin layers according to one embodiment of the present invention. At least one skin layer 42 is disposed externally to a plurality of layers 44 such that the at least one skin layer 42 covers a top surface and/or a bottom surface of the plurality of layers 44. Affixing the plurality of layers 44 to at least one skin layer 42 is especially beneficial in situations in which the plurality of layers 44 includes recycled content that is not approved to contact foodstuff. In one embodiment, the at least one skin layer 42 includes at least one virgin material approved to contact foodstuff and/or at least one recycled material approved to contact foodstuff.

Figure 7:
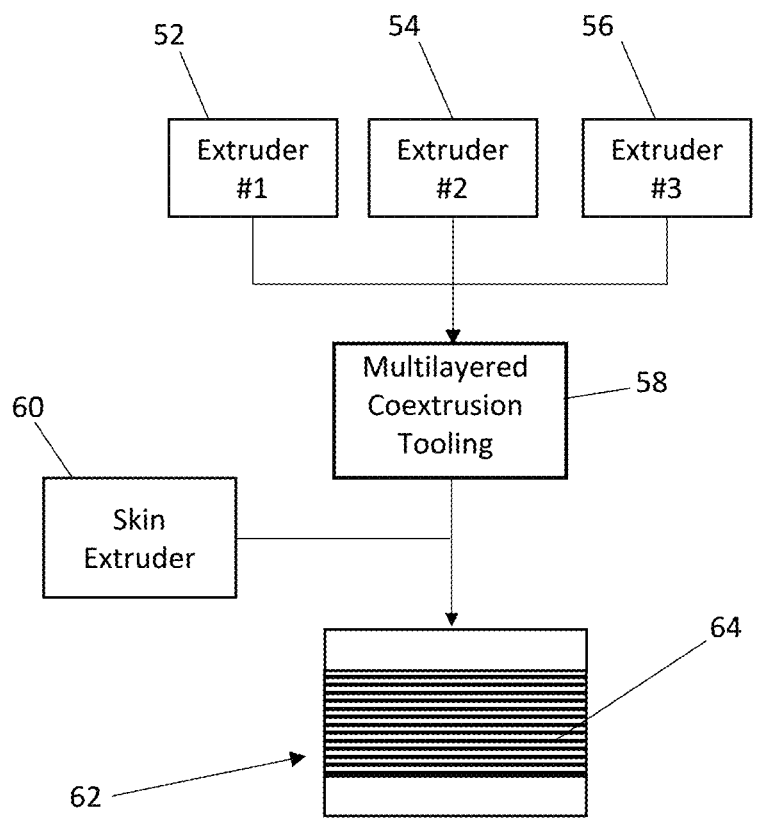
FIG. 7 illustrates a method of creating a layered film structure according to one embodiment of the present invention.

FIG. 7 illustrates a method of creating a layered film structure according to one embodiment of the present invention. The layered film structure is created by first extruding at least one polymer from a plurality of extruders 52, 54, 56 into a coextrusion block. For example, in one embodiment, a first extruder 52 extrudes a first polymer into the coextrusion block, and a second extruder 54 extrudes a second polymer on top of the first polymer to create a two-layer structure. In another embodiment, as shown in FIG. 7, a first extruder 52 extrudes a first polymer into the coextrusion block, a second extruder 54 extrudes a second polymer on top of the first polymer, and a third extruder 56 extrudes a third polymer on top of the second polymer to create a three-layer structure. One of ordinary skill in the art will understand that the number of extruders able to be used in the present invention is not intended to be limited to three, and any number of extruders is operable to be used for the present invention, depending on the requirements of the structure to be created. Furthermore, one of ordinary skill in the art will understand that at least two of the extruders are able to extrude the same polymer, and that the polymers extruded by different extruders are not necessarily different.

After the initial layered structure is extruded, it is passed through at least one multiplier die 58. Passing a layered structure through each of the at least one multiplier die 58 causes the number of layers in the structure to double, with the pattern present in the initial layered structure being vertically duplicated. For example, if the initial layered structure has a pattern of ABCAC, then the layered structure after it passes through a single multiplier die will have a layered structure of ABCACABCAC. The number of multiplier dies used for any particular processing step depends on the final number of layers desired for the structure. For example, if the initial layered structure has 2 layers and the final product is meant to have 128 total layers, then six multiplier dies will be used.

In one embodiment, after the layers are multiplied by the at least one multiplier die 58, at least one skin extruder 60 is used to extrude one or more skin layers onto the top and/or bottom surface of the layered structure 64 to produce the final film product 62.

Figure 8:
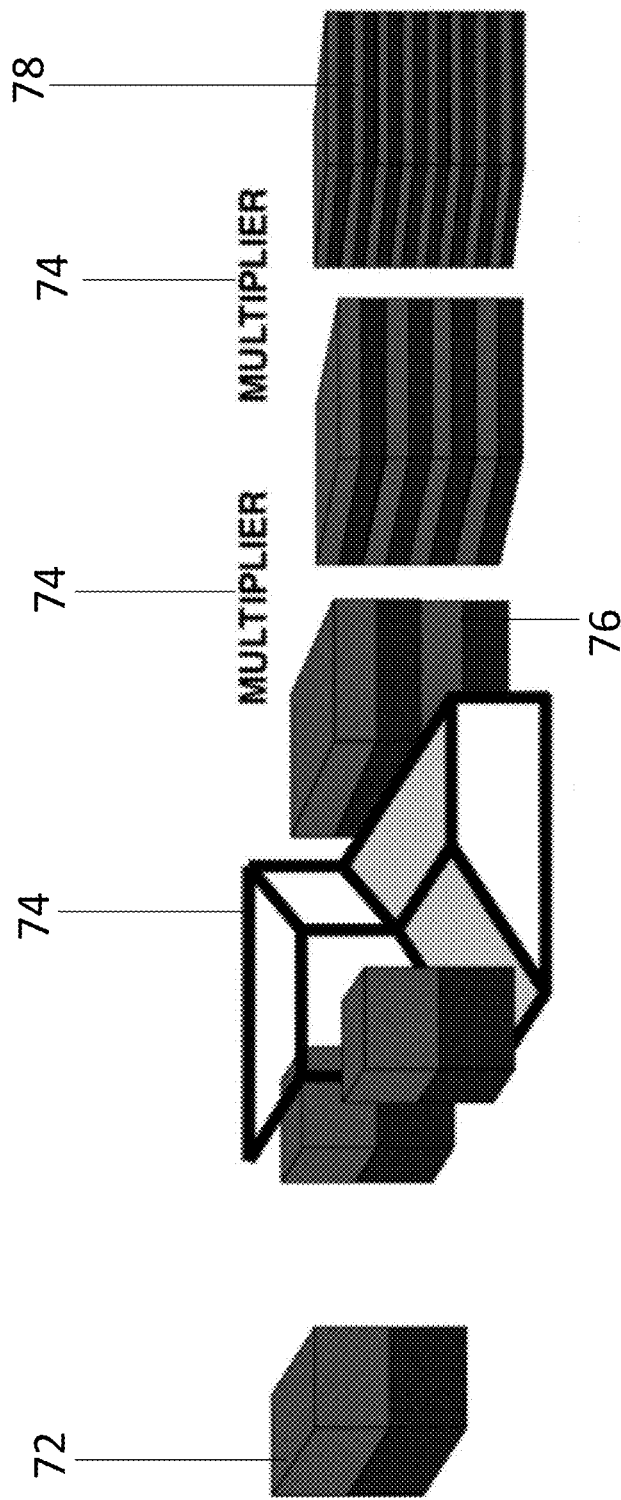
FIG. 8 illustrates the operation of a die block in creating a layered film structure according to one embodiment of the present invention.

FIG. 8 illustrates the operation of a die block in creating a layered film structure according to one embodiment of the present invention. After an initial layered structure 72 is extruded, the initial layered structure 72 is passed through at least one multiplier die 74. As shown in FIG. 8, the at least one multiplier die 74 includes a split wedge structure, causing the initial layered structure 72 to split in half, with one half moving slightly upwardly and another half moving slightly downwardly before the two halves recombine to produce a layered structure 76 with twice the number of layers compared to the initial layered structure 72. This process continues through a designated number of multiplier die 74 until a final layered structure 78 is produced. A method for producing multilayered structures is described in U.S. Pat. No. 10,549,504, which is incorporated herein by reference in its entirety.

Figure 9:
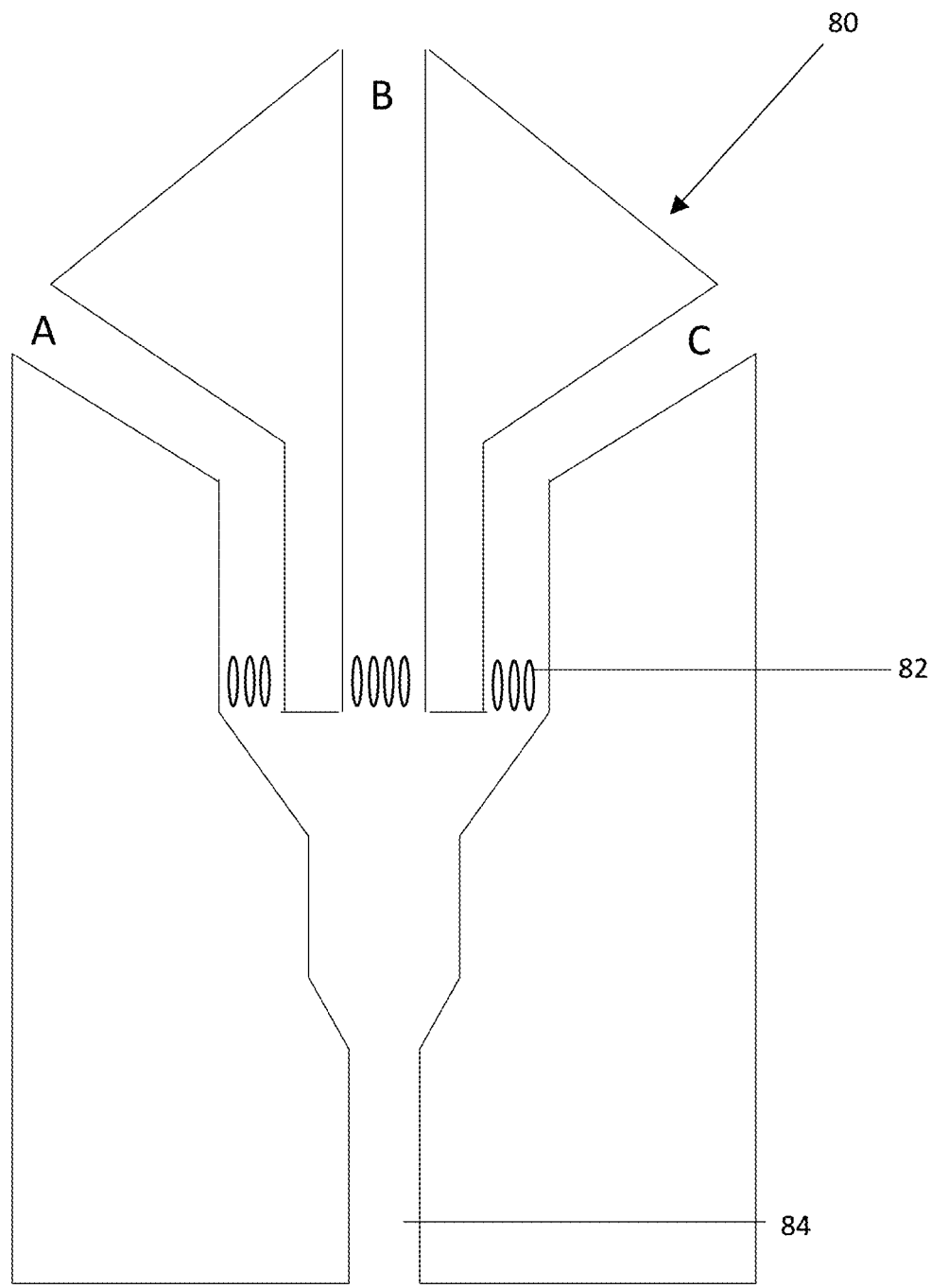
FIG. 9 illustrates a side view of a coextrusion feedblock for creating a multilayer film according to one embodiment of the present invention.

One of ordinary skill in the art will understand that formation of a multilayered structure in the present invention is not limited to applications utilizing multiplier die. Multilayered coextrusion tooling able to be used for the present invention includes one or more multiplier die and/or one or more coextrusion feedblocks. In one embodiment, a coextrusion feedblock is a block into which one or more polymers are extruded, wherein the coextrusion feedblock is configured to shape the extruded polymers into a well-defined stack of the one or more polymers. By way of example and not limitation, FIG. 9 illustrates a coextrusion feedblock for creating a multilayer film according to one embodiment of the present invention. The coextrusion feedblock 80 includes channels for accepting one or more extruded polymers, labeled A, B, and C. In one embodiment, the coextrusion feedblock 80 includes one or more layer separators 82. The layer separators 82 assist in controlling the sizing of the layers. The coextrusion feedblock 80 includes an output channel 84 for outputting the formed layered structure. In one embodiment, the output channel 84 is narrower or wider than the section of the coextrusion feedblock 80 having the layer separators 82, such that the overall size of the output multilayered structure is able to be controlled. In one embodiment, the layer separators 82 are located within each of the input channels, as shown in FIG. 9. In one embodiment, the layer separators 82 are located in the output channel 84. In one embodiment, the size of the input channels are configured to control the proportionality of each of the one or more polymers in the multilayered structure. Another example of a coextrusion feedblock is found in U.S. Pat. No. 9,808,980, which is incorporated herein by reference in its entirety. One of ordinary skill in the art will understand that coextrusion feedblocks of any configuration and/or size are capable of being used in this application as are suitable for forming particular multilayered structures. In one embodiment, the outputs of multiple coextrusion feedblocks are combined to form a single multilayered structure. One of ordinary skill in the art will appreciate that output structures from the coextrusion feedblocks are able to be run through one or more multiplier die, as shown in FIG. 8. Therefore, the present invention is not limited to only using a coextrusion feedblock or multiplier die, but is capable of using both as well.

In another embodiment, processes other than flat cast extrusion are used to form the multilayer structure. By way of example, and not of limitation, in one embodiment, the multilayer structure is formed through a film blowing process, such as that described in U.S. Pat. No. 9,481,143, which is incorporated herein by reference in its entirety. Films produced by the film blowing process include both flat films and annular films, as described in U.S. Pat. No. 9,481,143. Blown extrusion and flat cast extrusion each have distinct advantages. For example, for some materials, flat cast extrusion is preferrable, as flat cast extrusion tends to work better for materials having higher density and/or higher molecular weight. Furthermore, flat cast extrusion tends to be quicker than blown film extrusion. However, blown film extrusion works well for producing large sheets of material quickly and for producing materials with more uniform layer orientations. Therefore, one of ordinary skill in the art will appreciate that there are distinct advantages to using each technique.

In one embodiment, at least one of the plurality of layers includes at least one additive. In one embodiment, the at least one of the plurality of layers includes between 1% and 50% by volume of the at least one additive. Including additives into the plurality of layers allows manufacturers to more precisely fine tune the mechanical properties of the multilayer structure.

In one embodiment, the materials used for the at least one A layer and the at least one B layer include thermoplastic materials, glass-like materials (e.g., acrylic, polycarbonate polymers, and other materials with a similar glass transition temperature to soda-lime glass), crystalline materials, elastomers, and/or other materials that are melt-processable and therefore able to be coextruded. Thermoplastic materials are those that melt to a liquid when heated and freeze to a glassy state when subsequently cooled. In one embodiment, the at least one A layer and/or the at least one B layer do not include any thermosetting or crosslinked polymers.

In one embodiment, the at least one A layer and the at least one B layer each comprise polymer materials selected from the group consisting of polyacetals, polyacrylics, polycarbonates, polystyrenes, polyolefins, polyesters, polyamides, polyaramides, polyamide-imides, polyarylates, polyurethanes, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polyvinyl ethers, polyvinyl alcohols, polyvinyl ketones, polyvinyl nitriles, polyvinyl esters, polysulfonates, polysulfides, polyphenylenesulfides, polythioesters, polysulfonamides, polyureas, polypropylenes, polyethylenes, polymethylpentene (and co-polymers thereof), polynorbornene (and co-polymers thereof), polyethylene terephthalates, Polychlorotrifluoroethylene, perfluoro(methyl vinyl)ether, hexafluoropropylene, perfluoro (propyl vinyl)ether, polyvinylidene fluorides, polysiloxanes, styrene block copolymers (e.g., styrene-butadiene-styrene (SBS), styrene-ethylene-butadiene-styrene (SEBS)), polyvinyl chloride, or the like, or a combination comprising at least one of the foregoing thermoplastic polymers. Any of the aforementioned polymer materials are operable to be virgin materials or recycled materials as applicable, and are operable to combined in a variety of ways to create the at least one A layer and/or the at least one B layer depending on desired properties of the resulting film.

In a preferred embodiment, the at least one A layer and/or the at least one B layer comprise at least one polyolefin. Polyolefins, such as polyethylene and polypropylene, are available at a lower cost than many other polymers and have desirable properties for use in multilayer structures.

Polyolefins include, by way of example, polyethylene and copolymers thereof (e.g., HDPE, LDPE, LLDPE, medium-density polyethylene (MDPE)), polypropylene and copolymers thereof (e.g., high crystallinity polypropylene (HCPP), random copolymer polypropylene (RCP), isotactic polypropylene (iPP)), polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Blends of polyolefins include, but are not limited to, blends containing polyethylene and polypropylene, low-density polyethylene and high-density polyethylene, and polyethylene and olefin copolymers containing the copolymerizable monomers, some of which are described above, e.g., ethylene and acrylic acid copolymers; ethyl and methyl acrylate copolymers; ethylene and ethyl acrylate copolymers; ethylene and vinyl acetate copolymers-, ethylene, acrylic acid, and ethyl acrylate copolymers, and ethylene, acrylic acid, and vinyl acetate copolymers. Polyolefins are understood to include polyolefin plastomers and/or polyolefin elastomers.

Polyamides include, by way of example, synthetic linear polyamides, e.g., nylon-6, nylon-6,6, nylon-11, or nylon-12, condensation polymers of a $C_{2-12}$ dicarboxylic acid and a $C_{2-12}$ alkylenediamine.

Thermoplastic polyurethane polymers include aliphatic, cycloaliphatic, aromatic, and polycyclic polyurethanes.

Polyacrylates and polymethacrylates include, for example, polymers of acrylic acid, methyl acrylate, ethyl acrylate, acrylamide, methylacrylic acid, methyl methacrylate, n-butyl acrylate, and ethyl acrylate. Polyesters include, by way of example, condensation polymers of a $C_{2-12}$ dicarboxylic acid and a $C_{2-12}$ alkylenediol. Polyesters further include both virgin and polyethylene terephthalate (PET) and recycled polyethylene terephthalate (rPET).

In one embodiment, the materials for each type of layer are selected such that they are miscible, partially miscible, and/or soluble with the materials comprising adjacent types of layers. By selecting materials that are miscible or partially miscible with adjacent layers, the layers are more easily able to be joined together, as the portion of the material directly adjacent to surrounding layers is more easily able to diffuse into the surrounding layers, thereby creating a pseudo-tie layer at the boundaries between each layer. The pseudo-tie layer is a sublayer of adjacent layers wherein material from one layer migrates into the adjacent layer and vice versa, creating at least one attachment point between the layers that prevents the layers from being easily mechanically separable.

In another embodiment, at least one tie polymer and/or at least one grafted polymer is included. In one embodiment, the at least one tie polymer and/or the at least one grafted polymer is useful in ensuring that the plurality of layers adhere to each other and therefore the structure has superior internal adhesion. In one embodiment, the at least one tie polymer and/or the at least one grafted polymer is blended with and interspersed within at least one other polymer before being extruded into the multilayered coextrusion tooling (e.g., at least one feedblock and/or at least one multiplier die). In another embodiment, the at least one tie polymer and/or the at least one grafted polymer is co-extruded between layers of the plurality of layers in order to bind together the plurality of layers. Exemplary tie polymers and/or grafted polymers according to the present invention include, but are not limited to, maleic anhydride-grafted HDPE (MAH-HDPE), maleic anhydride-grafted LLDPE (MAH-LLDPE), ethylene acrylic acid (EAA), ethylene vinyl acetate (EVA), and/or at least one ionomer (e.g., SURLYN). By way of example, and not of limitation, in one embodiment, MAH is grafted onto a polymer of HDPE before being extruded into the multilayered coextrusion tooling. In another example, MAH is grafted onto a polymer of PP before being extruded into the multilayered coextrusion tooling. In another embodiment, no tie polymers and/or grafted polymers are used and no distinct tie layers are extruded, as the pseudo-tie layer formed between adjacent layers is sufficient for structural integrity of the multilayer structure.

The polypropylene discussed with regard to the present invention corresponds to the recycle triangle number 5. The polyethylene terephthalate (PET) discussed with regard to the present invention corresponds to the recycle triangle number 1. The high-density polyethylene (HDPE) discussed with regard to the present invention corresponds to the recycle triangle number 2. The polyvinyl chloride (PVC) discussed with regard to the present invention corresponds to the recycle triangle number 3. The low-density polyethylene (LDPE) discussed with regard to the present invention corresponds to the recycle triangle number 4. The polystyrene discussed with regard to the present invention corresponds to the recycle triangle number 6.

In one embodiment of the present invention, the film is partially recyclable. In another embodiment of the present invention, the film is fully recyclable and able to be recycled in any class of recycling center, including both consumer and industrial recycling centers.

In one embodiment, the layered film structure includes LDPE and EVOH. In one embodiment, the layered film structure includes about 90% LDPE and about 10% EVOH. In one embodiment, at least one polymer within the layered structure is a recycled blend of 90% LDPE and 10% EVOH. Including layers of very low thickness (e.g., nanolayers) enables a control of the recycled multiphasic material morphology to percolate, or form a continuous pathway of, high aspect ratio, higher barrier polymer domains to self-assemble within the recycled film internal layers during film processing. By enabling the multiphasic polymer blend layer to self-assemble, the higher barrier polymer material forms high aspect ratio isolated domains or layer-in-a-layer, relatively impermeable structures/phases as compared to a blend matrix polymer. The higher aspect ratio barrier polymer domains or layer-in-a-layer structure result in permeation drops for through direction gas or water diffusion and transport through the sample in a known, predictable manner due to increased diffusion path tortuosity.

Example 1

In one embodiment, virgin polypropylene and recycled polypropylene were arranged into 50 micron-thick multilayered structures in various percentages and with varying numbers of layers. The tensile modulus, 2% secant modulus, and ultimate stress for each configuration was compared to a 50 micron-thick sample of pure virgin polypropylene and a 50 micron-thick sample of pure recycled polypropylene. Multilayered structures including 90% virgin, 10% recycled polypropylene, 70% virgin, 30% recycled polypropylene, and 50% virgin, 50% recycled polypropylene were tested. For each different percentage of recycled polypropylene, melt blend, dry blend, 3-layer, 32-layer, and 129-layer iterations were tested, with the exception of a 3-layer 90% virgin, 10% recycled polypropylene, and a melt-blend 50% virgin, 50% recycled polypropylene, neither of which yielded a usable sample.

Results showed that for both the 50% virgin, 50% recycled, and 90% virgin, 10% recycled samples, the 32-layered iteration exhibited the greatest ultimate stress. For the 70% virgin, 30% recycled sample, the 129-layer iteration exhibited the greatest ultimate stress, though it showed a value close to that of the 32-layer iteration. The 32-layer iterations of the 50/50 and 90/10 samples yielded ultimate stress values of 25.9 MPa and 26.8 MPa, both higher than the ultimate stress of the pure recycled sample (6.8 MPa) and even the pure virgin sample (20 MPa). Furthermore, each of the 32-layer iterations showed improved tensile moduli and 2% secant moduli relative to both control samples. The results of these tests are shown in Table 1 below.

TABLE 1

Mechanical properties of virgin polypropylene (PP)/recycled polypropylene (rPP) films

| No. | Composition (PP/rPP)% | Blend Type | Layers | Young's Modulus (MPa) | Modulus Secant 2% (MPa) | Stress at Break (MPa) |
|---|---|---|---|---|---|---|
| 1 | 100/0 | N/A | N/A | 507 | 304 | 20 |
| 2 | 0/100 | N/A | N/A | 1,158 | 424 | 6.8 |
| 3 | 50/50 | Dry Blend | N/A | 642 | 511 | 10.1 |
| 4 | 50/50 | N/A | 3 | 882 | 658 | 12.1 |

TABLE 1-continued

Mechanical properties of virgin polypropylene (PP)/recycled polypropylene (rPP) films

| No. | Composition (PP/rPP)% | Blend Type | Layers | Young's Modulus (MPa) | Modulus Secant 2% (MPa) | Stress at Break (MPa) |
|---|---|---|---|---|---|---|
| 5 | 50/50 | N/A | 32 | 913 | 688 | 25.9 |
| 6 | 50/50 | N/A | 129 | 843 | 672 | 16.8 |
| 7 | 70/30 | Melt Blend | N/A | 692 | 487 | 17.8 |
| 8 | 70/30 | Dry Blend | N/A | 652 | 461 | 14.3 |
| 9 | 70/30 | N/A | 3 | 825 | 641 | 13.5 |
| 10 | 70/30 | N/A | 32 | 945 | 664 | 19 |
| 11 | 70/30 | N/A | 129 | 878 | 708 | 21.1 |
| 12 | 90/10 | Melt Blend | N/A | 751 | 357 | 12.6 |
| 13 | 90/10 | Dry Blend | N/A | 504 | 299 | 12.5 |
| 14 | 90/10 | N/A | 32 | 756 | 524 | 26.8 |
| 15 | 90/10 | N/A | 129 | 966 | 754 | 12.9 |

The term "virgin polymer" and the adjective "virgin" modifying any specific polymer as they are used in this application mean that the polymer consists of prime non-recycled material, as opposed to a recycled material. Additionally, the term "recycled" as it is used in this application means any combination of post-consumer recycled content and/or post-industrial recycled content. The term recycled is not intended to be limited to any particular form of recycling and includes polymers subjected to any form of recycling process, including any all forms of mechanical and chemical recycling, and including those done in any class of recycling center. For the purposes of the present invention, "nanolayers" are defined as layers having a thickness of between about 0.5 nm and about 500 nm. For the purposes of the present invention, "microlayers" are defined as layers having a thickness between about 0.5 microns and about 5 microns.

Potential uses of the present invention include diaper backsheets, feminine hygiene backsheet products, medical gauze backing, medical drapes liners, medical bed protection pads backsheet, food and/or beverage packaging for stand up pouches, modified atmosphere packaging controlled atmosphere packaging, thermoformed automotive parts, thermoformed industrial parts, and/or industrial remediation absorbent pad backsheets.

The term "film" as used herein is defined as any continuous polymeric material. While the term "film" is commonly used to refer to thin films, having a thickness less than about 50 microns, the definition of film as described herein is not intended to be limited to thin films and includes both thin films and thick films having thicknesses greater than about 50 microns. "Sheet" as used to refer to the present invention refers to continuous polymeric materials having a thickness greater than about 50 microns. "Extrusion coating" as used herein is defined as referring to any coating of material extruded onto the surface of another material. The term "extrusion coating" as used herein is not intended to be limited to any range of thickness of the extruded material.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A film, comprising:
a coextruded plurality of layers, including at least one A layer and a plurality of B layers;
wherein the at least one A layer comprises virgin polymer;
wherein the virgin polymer is virgin low-density polyethylene or virgin polypropylene;
wherein the plurality of B layers comprise recycled polymer;
wherein the recycled polymer is recycled low-density polyethylene or recycled polypropylene;
wherein the recycled polymer includes post-consumer recycled material;
wherein the plurality of layers includes at least 32 layers;
wherein each of the plurality of layers has a thickness between about 100 nm and about 3 microns;
wherein the plurality of layers includes a simple alternating pattern between the at least one A layer and the plurality of B layers;
wherein the film has a total thickness of between approximately 25 microns and 100 microns; and
wherein the film is formed via a flat casting process.

2. The film of claim 1, wherein the plurality of layers includes between 32 and about 150 layers.

3. The film of claim 1, wherein the plurality of layers further includes at least one type of layer other than the at least one A layer and plurality of B layers.

4. The film of claim 1, further comprising at least one skin layer, wherein the at least one skin layer is affixed to a top surface and/or a bottom surface of the plurality of layers.

5. The film of claim 1, wherein the plurality of layers includes at least 10% recycled polymer resin by weight.

6. The film of claim 1, wherein the plurality of layers includes at least 50% recycled polymer resin by weight.

7. The film of claim 1, wherein the film has a greater ultimate stress and a greater tensile modulus than a second film consisting of the virgin polymer and the recycled polymer, wherein the second film is substantially as thick as the film, and wherein the second film includes layers with a thickness greater than 10 microns or wherein the second film is an unlayered blend of the virgin polymer and the recycled polymer.

8. The film of claim 1, wherein each of the plurality of layers has a thickness between about 0.5 microns and about 2 microns.

9. The film of claim 1, wherein the film is incorporated into diaper backsheets, feminine hygiene backsheet products, medical gauze backing, medical drapes liners, medical bed protection pads backsheet, food and/or beverage packaging for stand up pouches, modified atmosphere packaging controlled atmosphere packaging, pharmaceutical reactor liners, thermoformed automotive parts, thermoformed industrial parts, and/or industrial remediation absorbent pad backsheets.

10. A sheet, comprising:
a plurality of layers, including at least one A layer and a plurality of B layers;
wherein the at least one A layer comprises virgin polymer;
wherein the virgin polymer is virgin low-density polyethylene or virgin polypropylene;
wherein the plurality of B layers comprise recycled polymer;
wherein the recycled polymer is recycled low-density polyethylene or recycled polypropylene;
wherein the recycled polymer includes post-consumer recycled material;
wherein each of the plurality of layers has a thickness between about 100 nm and about 3 microns;

wherein the plurality of layers includes a simple alternating pattern between the at least one A layer and the plurality of B layers;

wherein the sheet has a total thickness of between approximately 25 microns and 100 microns;

wherein the sheet is formed via a flat casting process;

wherein the sheet consists solely of the plurality of layers; and wherein the sheet has a greater ultimate stress and a greater tensile modulus than a second sheet consisting of the virgin polymer and the recycled polymer, wherein the second sheet is substantially as thick as the sheet, and wherein the second sheet includes layers with a thickness greater than 10 microns or wherein the second sheet is an unlayered blend of the virgin polymer and the-recycled polymer, and wherein the total percentage weight of the virgin polymer and the recycled polymer is substantially the same between the sheet and the second sheet.

11. The sheet of claim 10, wherein the plurality of layers includes between about 2 and about 1500 layers.

12. The sheet of claim 10, wherein the plurality of layers includes at least 10% recycled polymer resin by weight.

13. The sheet of claim 10, wherein the plurality of layers includes at least 30% recycled polymer resin by weight.

14. The sheet of claim 10, wherein each of the plurality of layers has a thickness between about 0.5 microns and about 2 microns.

15. The sheet of claim 10, wherein the sheet is incorporated into stamped and/or thermoformed food packaging, thermoformed beverage packaging, thermoformed modified atmosphere packaging and/or controlled atmosphere packaging, thermoformed pharmaceutical packaging for medicines, thermoformed automotive parts, thermoformed industrial parts, and/or industrial remediation absorbent pad backsheets.

16. A polymer extrusion coating, comprising:

a plurality of layers, including a plurality of A layers and a plurality of B layers;

wherein the plurality of A layers comprise virgin polymer;

wherein the virgin polymer is virgin low-density polyethylene or virgin polypropylene wherein the plurality of B layers consist of recycled polymer;

wherein the recycled polymer is recycled low-density polyethylene or recycled polypropylene;

wherein the recycled polymer includes post-consumer recycled material;

wherein each of the plurality of layers has a thickness between about 100 nm and about 3 microns;

wherein the plurality of layers includes a simple alternating pattern between the at least one A layer and the plurality of B layers;

wherein the polymer extrusion coating has a total thickness of between approximately 20 microns and 70 microns; and wherein the polymer extrusion coating is formed via a flat casting process.

* * * * *